March 4, 1969  R. C. WEATHERSTON  3,430,847
ROTARY WAVE COMPRESSORS AND THE LIKE
Filed Aug. 15, 1966  Sheet 1 of 4

INVENTOR.
ROGER C. WEATHERSTON
BY
AGENT.

March 4, 1969  R. C. WEATHERSTON  3,430,847
ROTARY WAVE COMPRESSORS AND THE LIKE
Filed Aug. 15, 1966

INVENTOR.
ROGER C. WEATHERSTON
BY
AGENT.

INVENTOR.
ROGER C. WEATHERSTON
BY
AGENT.

INVENTOR:
ROGER C. WEATHERSTON
BY.
AGENT.

United States Patent Office 3,430,847
Patented Mar. 4, 1969

3,430,847
ROTARY WAVE COMPRESSORS AND THE LIKE
Roger C. Weatherston, Williamsville, N.Y., assignor to Cornell Aeronautical Laboratory, Inc., Buffalo, N.Y., a corporation of New York
Filed Aug. 15, 1966, Ser. No. 572,600
U.S. Cl. 230—150    28 Claims
Int. Cl. F04c 17/04; F01c 3/06; F02b 55/00

ABSTRACT OF THE DISCLOSURE

A fluid rotary compressor and/or motor, one or more pistons rotatable in one or more annular expansible chambers, a rotary abutment member providing a closure and an escapement for the piston or pistons, gears synchronizing piston movement with abutment movement and supply and exhaust passages in the cylinder walls and/or the abutment member.

---

The present invention relates to rotary wave expansible chamber devices that function as fluid compressors and fluid expanders or fluid motors. More specifically the present invention relates to such devices wherein the expansible chamber is characterized by a continuously rotating working member and a rotating abutment member moving in synchronization therewith.

Conventional positive displacement rotary devices, while having definite advantages over reciprocating compressors or motors, cannot compete on a power-to-size basis with axial flow compressors or turbines. The main reason for this failure to compete is attributable to the inability of present designs to efficiently achieve sufficiently high piston or working member displacement rates.

It is accordingly an object of the present invention to provide a rotary expansible chamber device that operates efficiently at sufficiently high enough displacement rates to compete favorably with axial flow compressors on a power-to-size basis.

At the high displacement rates contemplated by the present apparatus compression and expansion is not accomplished by conventional quasi steady state processes, but rather by nonsteady flow processes characterized by compression (shock) waves and expansion fans.

It is therefore a further object of the present invention to provide a rotary wave device that functions as a compressor or an expander incorporating into its design, relationships that are dictated by nonsteady flow phenomena.

As is well known, gas turbines cannot utilize a high temperature working fluid above about 1,500° F. In addition, axial flow compressors require many stages for efficient high compression operation. Moreover, these types of machinery are seriously limited in their utilization of abrasive or corrosive fluids.

It is further an object of the present invention to provide an apparatus that can operate at high displacement rates with high temperature fluids.

A further object of the present invention is to provide an apparatus that can operate at displacement rates in the range of axial flow compressors and is capable of injesting relatively abrasive and/or corrosive fuels or working fluids.

A still further object of the present invention is to provide an apparatus that can operate at substantially the same displacement rates of axial flow compressors without requiring many stages for high compression.

A further object of the present invention is to provide a rotary wave expansible chamber device that does not require lubrication or direct contact sealing between the working members and its cylinders.

A still further object of the present invention is to provide a rotary wave expansible chamber device wherein a plurality of working members in stacked relation are serviced by a single abutment member.

Basically, the principles of the present invention are achieved by providing means defining a generally annular cylinder, piston means rotatably mounted in said cylinder, the cross sectional area of said piston and that of said annular cylinder being so related as to provide a finite clearance area between said piston and cylinder equal to a small percentage of the piston area, an abutment means rotating in timed relation with said piston and means providing fluid communication with said cylinder, the area of said last mentioned means being at least substantially equal to the cross-sectional area of said cylinder.

In order to achieve the high displacement rates contemplated by the present invention, the fluid flow rates must be considerably higher than those of equivalent sized prior art devices. This is accomplished, according to the present invention, by providing for substantially unrestricted communication between the supply to and exhaust from the cylinder. In this manner, undesirable high flow losses or choking at the inlets or outlets, which would severely limit the mass rate of flow, is avoided. In addition, the piston or working members must be permitted to move at very high speeds. Prior art devices have critical sealing requirements between pistons and cylinder, utilizing piston rings or the like. With such forms of direct contact sealing, friction between the piston and cylinder forbids high operating speeds. This limitation is overcome according to the present invention by providing a small but definite clearance between the piston and cylinder. At the high piston speeds contemplated by the present invention, it has been found that the leakage rate is small and tolerable compared to the piston displacement rate. Moreover, the piston lubrication problem is eliminated. As is apparent, the high speeds are responsible for the desired high power-to-weight ratios.

For a fuller understanding of the present invention, reference should be had to the following detailed description of the same taken in conjunction with the accompanying drawings wherein.

Figure 1:
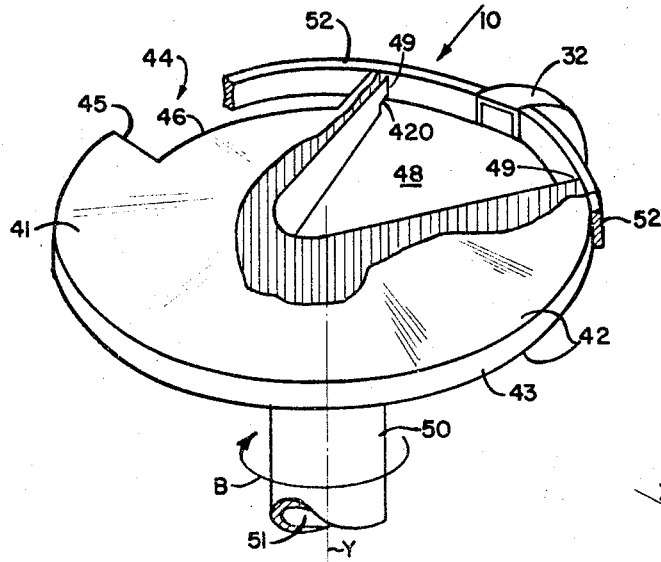
FIGURE 1 is a pictorial schematic view of a single piston and cylinder assembly according to the present invention with certain parts thereof broken away.
Figure 2:
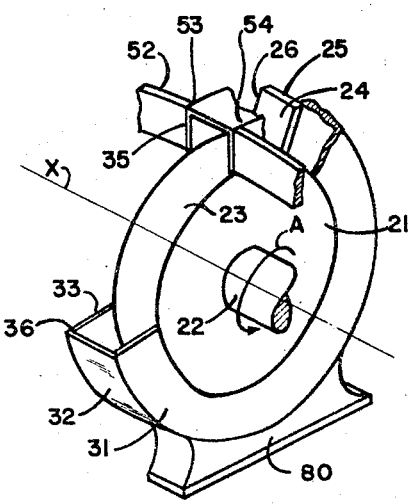
FIGURE 2 is an enlarged pictorial view of a portion of the structure shown in FIGURE 1.
Figure 3:
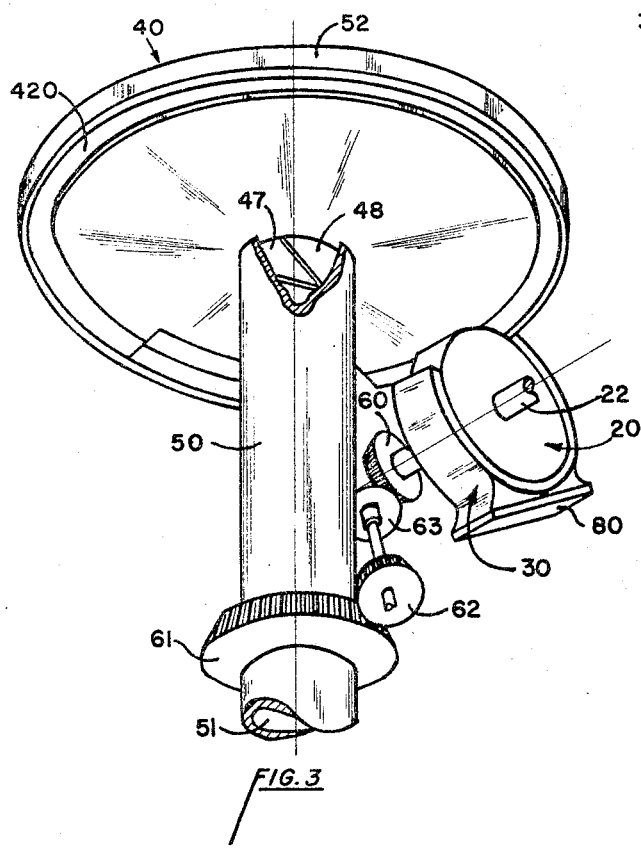
FIGURE 3 is a pictorial schematic view of the assembly of FIGURE 1 from a different angle.
Figure 1A:
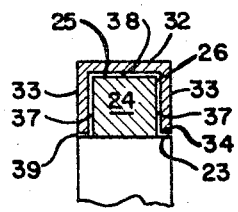
FIGURE 1A is a piston-cylinder section illustrating the clearances.

Referring now to the drawings and more particularly to FIGURES 1–3, the basic cylinder-piston and abutment assembly is indicated generally by the numeral 10 and is shown (FIGURE 3) as comprising a working member unit 20, a cylinder unit 30 and an abutment unit 40.

The unit 20 comprises a cylindrical hub 21 that is fixedly mounted on a solid shaft 22. As is common, shaft 22 is rotatably mounted on suitable bearings (not shown). The outer peripheral surface 23 of hub 21 has projecting radially outwardly therefrom a piston or working member 24 having a top edge 25 and side edges 26.

As shown piston 24 is rectangular in shape, although any other suitable shape would suffice.

The cylinder unit 30 comprises an annular inverted "U"-shaped channel 31 having an outer peripheral wall 32, two side walls 33 and bottom edge surfaces 34 that define two spaced open end faces 35 and 36 as shown spaced about 90° apart. Channel 31 is mounted on any suitable stationary means 80 in surrounding relation to the hub 21 and piston 24. The dimensions of the piston, hub and channel are so chosen that a definite clearance space exists therebetween. Thus, numeral 37 depicts the clearance between piston side edges 26 and channel side walls 33, numeral 38 depicts the clearance between piston top edge 25 and channel outer wall 32 and numeral 39 depicts the clearance between channel bottom surfaces 34 and hub peripheral surface 23. It has been found that clearance areas ranging from 0.3 to 3.0 percent of the piston area provide the requisite frictionless, lubrication-less freedom of motion between the piston and channel; such freedom being necessary to permit very high speeds of operation, and yet keep the leakage to a tolerable level. The leakage source from clearance 39 is usually larger than the piston leakage sources from clearances 37 and 38; however, at the high piston speeds the total leakage (piston plus channel and hub) can be tolerated. Although shown here as an inverted "U," the channel 31 could take another convenient and suitable shape without departing from the spirit of the invention.

The abutment unit 40 includes a generally conically shaped abutment member 41 having conical top and bottom surfaces 42 and a peripheral side edge 43 which may be, for example, cylindrical; although other suitable shapes would suffice. Side edge 43 is interrupted by a cutaway escapement section 44 defined by a pair of radially inwardly extending surfaces 45 meeting a generally arcuate surface 46. The depth of surfaces 45 is dependent upon the height of piston 24, as will become apparent. The bottom surface 42 is undercut to define an annular flat lip 420. The bottom surface 42 also contains an opening 47 and communicating therewith is a wedge-shaped internal flow passage 48 that leads to an arcuate opening 49 on the peripheral side edge 43. As will become apparent hereinbelow, opening 49 functions as either a collection or discharge nozzle dependent upon whether the improved device is functioning as a fluid compressor or fluid motor. A tubular shaft 50 having an internal passage 51 is fixedly and sealingly attached to abutment member 41 with passage 51 in fluid communication with flow passage 48 through opening 47. Shaft 50 is mounted for rotation in conventional bearings (not shown). The axis of rotation, $y$, of shaft 50 is substantially perpendicular to the axis of rotation, $x$, of shaft 22 and the distance therebetween is so chosen that arcuate opening 49 as well as edge 43 as it sweeps past channel end face 35 is spaced therefrom just enough to prevent rubbing contact therebetween. In addition, the lip 420 is spaced with a small clearance from hub periphery 23 to provide a substantial seal thereat (see FIGURE 4).

The height of opening 49 is substantially equal to the height of channel end face 35 such that as opening 49 sweeps by end face 35, the flow from one to the other is unrestricted. The arcuate length of opening 49 is greater than the width of channel end face 35 thereby taking into consideration that it takes finite time for the total cross sectional area of the channel end face to be exposed. It is therefore apparent that the actual arcuate extent of opening 49 will depend, inter alia, upon the speed of abutment member 41. It is to be noted that channel end face 36 is freely exposed to the atmosphere so that flow thereto or therefrom is always unrestricted. Alternately, if some fluid other than air is utilized, a plenum chamber or reservoir could provide the unrestricted communication.

A cylindrical sealing band 52 at least equal in height to the height of opening 49 is attached at ends 53, 54 to side walls 33 of channel 31 and surrounds the entire edge surface 43 of abutment member 41. Band 52 functions to seal the passage 48 from the environment when not in communication with channel end face 35.

Suitable timing gears 60 and 61 are fixed respectively to shaft 22 and shaft 50 to synchronize the movement of one with respect to the other. A pair of bevel gears 62 and 63 may be provided in engagement with gears 60 and 61 to transmit the motion, as is conventional.

The foregoing description has characterized the basic rotary expansible chamber device according to the present invention. The embodiments to be described below depict certain refinements as applied to this basic device to increase its operating efficiency. However, before discussing these modifications the operation of the basic assembly will be described with reference to FIGURES 1–8.

Assuming the rotary expansible chamber device 10 is to function as a fluid compressor, shaft 22 will be driven by suitable high speed motor means (not shown) in the direction of arrow A. This rotation produces rotation of abutment member 41 in the direction of arrow B. As is obvious, the piston and abutment are geared together such that the escapement cutaway just reaches the channel end face 35 as the piston just leaves the channel or cylinder.

The finite clearances existing between the moving and stationary elements as described supra permit the former to be rotated at very high speeds. Piston speeds of substantially 250–500 feet per second, for example, are possible; this is to be contrasted with speeds of 25–50 feet per second of conventional rotary abutment type expansible chamber devices. The ratio of piston speed to the initial speed of sound of the fluid being compressed is referred to as piston Mach number. At piston Mach numbers of from, say, 0.2 to 0.5 (equivalent to piston speeds of from 250–500 feet per second), the process of compression is not represented by homogenous conditions of pressure and temperature that vary as a function of time or piston position within the cylinder. Rather, compression is accomplished by nonsteady flow processed wherein only a few discrete pressure levels exist for a finite time within the cylinder. It is therefore necessary to synchronize the movements of the piston and the abutment on the basis of a nonsteady flow phenomenon rather than on the basis of quasi-steady flow phenomenon as experienced in conventional slow velocity rotary piston designs.

Figure 4A:
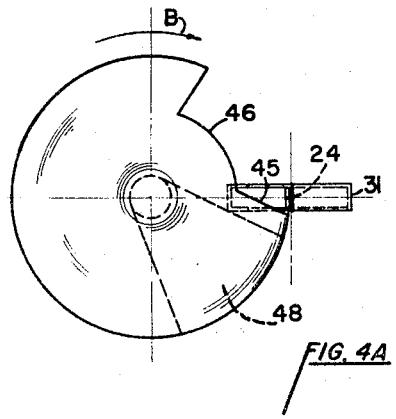
FIGURES 4–7 are schematic views illustrating the sequential operation of the device shown in FIGURE 1.
Figure 5A:
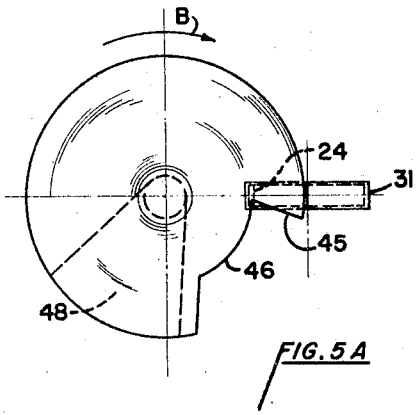
Figure 4:
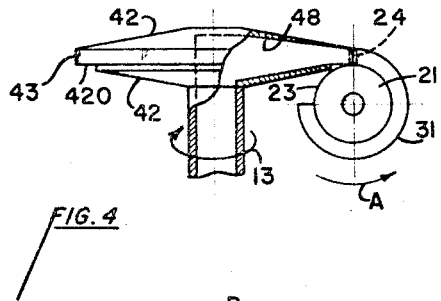
Figure 5:
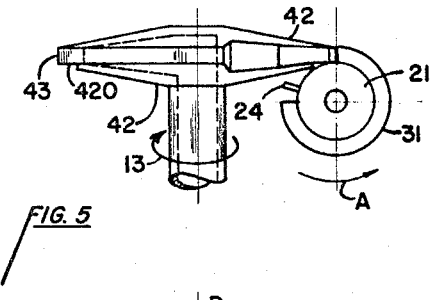
Figure 6A:
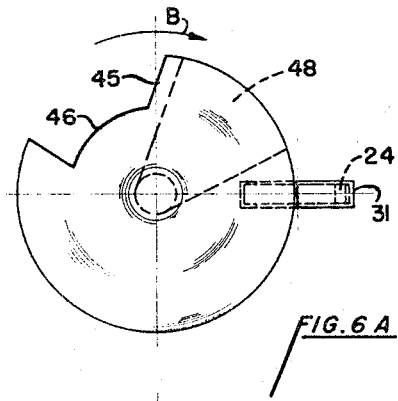
Figure 7A:
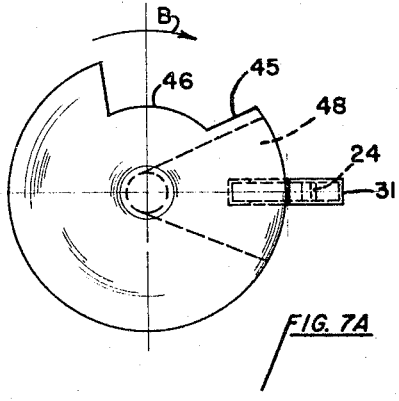
Figure 6:
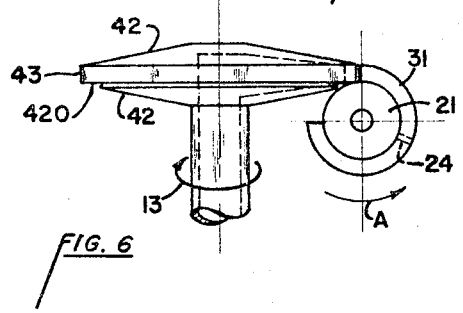
Figure 7:
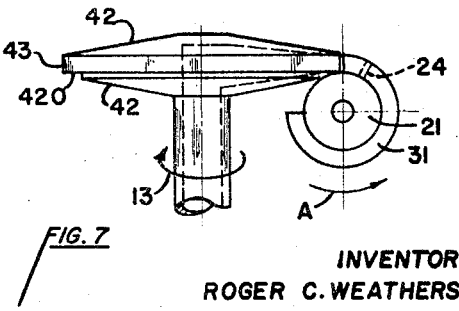
Figure 8:
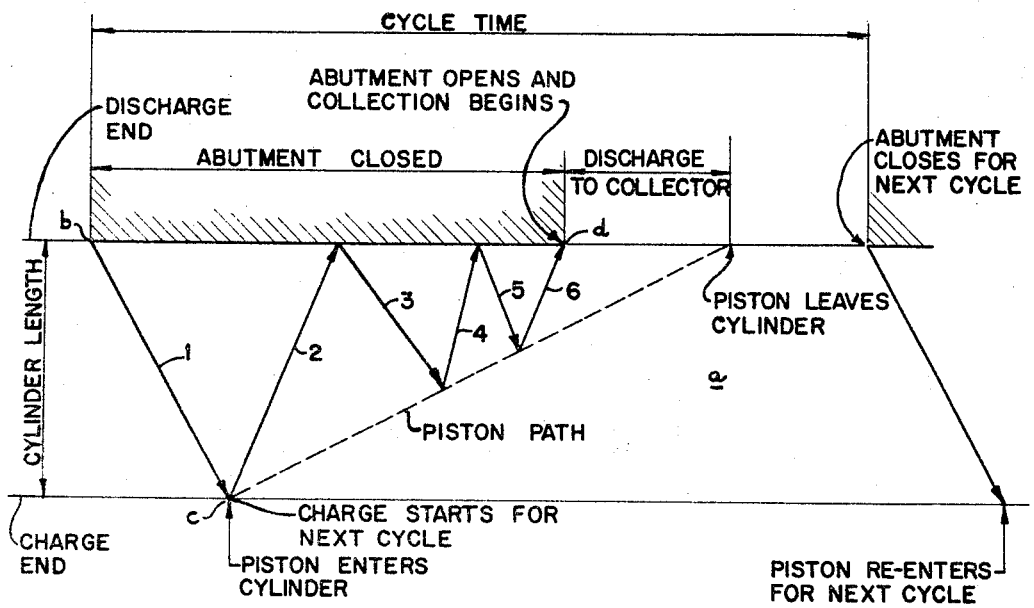
FIGURE 8 is an idealized wave diagram of piston displacement versus time, for a compression process.

With the foregoing in mind, a discussion of the operation will now proceed. For an initial point of operation, it is assumed that a discharge of high pressure gas from channel end face 35 to collector nozzle opening 49 has been completed and that cutaway escapement portion 44 is in line with end face 35 as shown in FIGURES 4 and 4A. The piston 24 has just left the channel end face 35 and is in the escapement portion. The piston is continuously drawing in a fresh charge of fluid at initial conditions from the atmosphere through end face 36 for succeeding cycles. Since the total channel cross sectional area is fully exposed at end face 36, the charge enters without restriction at the piston Mach number. This is depicted at region $a$ in FIGURE 8. The next step of significance is the closing of end face 35 by the side edge 43 of abutment 41 as shown in FIGURES 5 and 5A. It is to be noted that the piston has not yet passed through end face 36 to thereby reenter the channel. The closing of end face 35, depicted at $b$ in FIGURE 8, results in a hammer shock wave being created of such strength that it brings the flow to rest inside of the channel thereby increasing its pressure. The path of the shock wave is indicated at 1 in FIGURE 8. The piston should reenter end face 36 at or before the time the shock wave arrives thereat (depicted at $c$ in FIGURE 8). In this manner a precompression or supercharging of the incoming fluid is accomplished. When the piston reenters the channel, a series of shock waves (2 through 6 in FIGURE 8) go back and forth between the piston and the abutment side edge 43 until such time as the desired pressure level is established by the arrival of the last shock wave at the end face 35 (depicted at point d in FIGURE 8). As is known, these shock waves are produced by the action of the piston and the abutment alternately causing the fluid to be accelerated to the piston Mach number and to be stopped at the abutment end. At the time when the last shock arrives at the abutment side edge 43, the opening 49 of collection nozzle 48 just begins to uncover the channel end face 35 to receive the compressed fluid. This is also depicted at d in FIGURE 8.

Figure 9A:
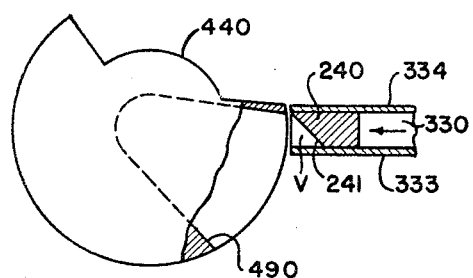
FIGURES 9A–9C are schematic views illustrating the advantages of a preferred piston shape.
Figure 9B:
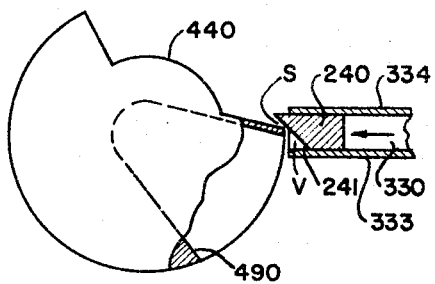
Figure 9C:
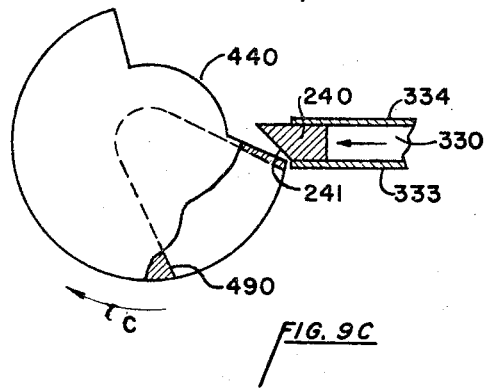

Although the piston 24 is shown as having a flat radial front face, a tapered face would provide for more efficient collection. This is illustrated in FIGURES 9A, 9B, and 9C wherein the piston 240 is shown as having a front face 241 tapering outwardly from the inner wall 333 to the outer wall 334 of channel 330. FIGURES 9A–9C show the transition from collection to escapement. It can be seen in FIGURE 9A that at the start of escapement with the abutment rotating in direction C, a volume, V, of high pressure fluid still remains in channel 330. If the piston face were radial, the volume, V, would be doubled and most of the fluid therein would be lost in the escapement portion 440 and in addition a leakage path would be opened from collector 490 to escapement portion 440, thereby markedly reducing efficiency. As shown, the tapered face maintains a seal at S and also allows substantially the total volume in space, V, to pass into the collector.

The seal afforded by band 52 prevents the collected gas in passage 48 from being discharged wastefully. The collected high pressure gas then flows through passage 50 for suitable utilization.

It thus can be seen that there are three critical timing relationships between the piston, channel and abutment, to wit: (1) arrival of abutment escapement portion at the channel end face 35 as piston leaves the end face; (2) arrival of piston 24 at channel end face 36 at or before the shock wave, due to abutment closing face 35, arrives thereat; and (3) arrival of opening 49 at channel face 35 as the last of the chosen number of shock waves (dependent upon desired pressure ratio) arrives thereat.

As stated earlier the first relationship is achieved by proper choice of gears 60, 61, 62, and 63. Since the second relationship depends upon the time it takes for a shock wave to travel the length of the channel, it is only necessary to adjust the length of the channel as by bringing end face 36 closer or further away from end face 35. The third relationship is achieved by adjusting the arcuate extent of collection nozzle opening 49 such that collection starts at the proper time.

As is apparent, the latter two relationships are dictated by the nonsteady compression processes which take place as a result of the high piston speeds. The consequences of not taking into account these nonsteady flow processes appear as losses which reduce overall efficiency. For example, if the piston does not enter channel face 36 at or before the arrival thereat of the shock wave, some of the initial pressure build-up in the channel, before piston action, will be dissipated. Thus the effect of supercharging will be diminished. Also, if the collection starts after the arrival of the last shock at end face 35, the fluid in the channel will be over-compressed and higher than the pressure in collector nozzle 49. Adjustment to the nozzle pressure would ultimately take place by undesirable dissipative throttling processes.

The finite clearances between the moving and stationary elements, enabling high piston Mach numbers, are sources of leakage, but at such high piston speeds the ratio of the leakage rate to the piston displacement rate is relatively small and tolerable.

Figure 10:
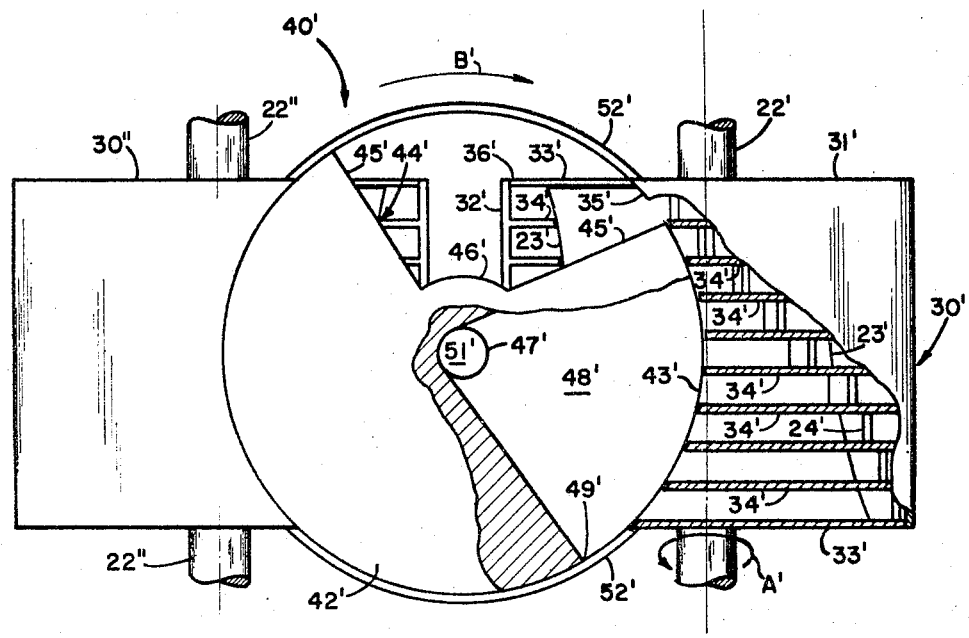
FIGURE 10 is a plan view of a modification of the device shown in FIGURE 1 with parts thereof broken away.
Figure 11:
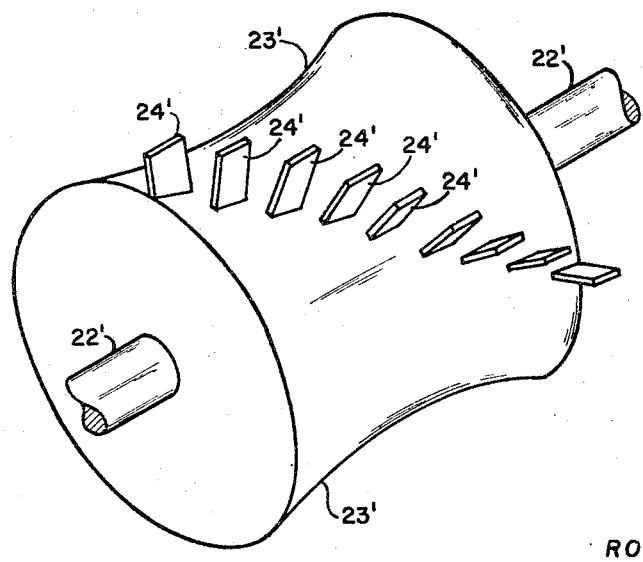
FIGURE 11 is a pictorial view of the drum and piston assembly shown in FIGURE 10.

One embodiment for obtaining higher ratios of piston displacement rates to leakage loss rates is shown in FIGURES 10 and 11. In these figures, like numerals refer to like parts with the exception of primes. The arrangement shown in FIGURES 10 and 11 comprise many cylinder units combined to form a stacked assembly 30' that is serviced by a single abutment unit 40'. For ease in assembly, the multicylinder units comprise an elongated generally cylindrical member 31' that is discontinuous defining an upper end face 35' and a spaced lower end face 36'. Member 31' is closed by side edges 33' and face 35' arcuately extends therebetween defining a circular surface that complements the circular surface of abutment side edge 43'. Interiorly of member 31' are a plurality of cylinder defining partitions or fingers 34', each extending from end face 35' to end face 36' intermediate side edges 33'. The fingers 34' extend inwardly from the peripheral surface 32' of cylinder member 31' and terminate adjacent a drum or hub 23'. As shown the drum is not cylindrical but is more hyperboloid in shape. The hyperboloid shape is necessary in order to maintain the substantial fluid seal between abutment lip 420 (see FIGURE 3) and the drum peripheral surface 23'. To maintain such a seal, the annular lip 420 that nearly touches the drum surface 23' must do so in substantially a common plane perpendicular to the abutment axis. The abutment lip 420 nearly contacts the center cylinder on the drum centerline parallel to the abutment axis but for the outer cylinders the contact is off the centerline in a direction toward the axis of the abutment. To accommodate the off centerline condition and yet maintain a common plane of abutment-drum contact it is necessary to increase the drum radii of the outer cylinders.

A plurality of pistons 24' extend generally radially outwardly from drum 23' and fit between each partition 34'; however, the front face elements of the pistons of the outer cylinder are not quite radial but at slight angle with respect to the drum radius. This is necessary so that the entire piston face will be parallel to the abutment face as it leaves its channel or cylinder. As is apparent, cylindrical member 31' must be split for receiving drum 23'. As shown, each successive piston is mounted at a slightly different angular position consistent with the timing requirements that each piston follow closely behind the aft abutment seal as it rotates in succession past each channel. The clearances between the elements are similar to that as previously described.

The abutment unit 40' is similar to abutment 40 previously described with the exception that escapement portion 44' is larger to accommodate the staggered pistons.

Each piston-cylinder unit operates with respect to the abutment member and collection nozzle 49' in the same manner as the single unit described above. The predominate leakage loss from clearance 39 as mentioned for the single cylinder case is markedly reduced in the instant stacked embodiment. This is true since, now, it is only the outer portions of the outer two channels which communicate with the atmosphere that experience this loss. There may be some drift from one channel to another intermediate the outer two, but fluid leaving one channel must reappear in another channel. This drift, therefore, does not constitute a loss to the outside environment. Thus, the channel and drum leakage loss to the atmosphere from the outer two cylinders is similar to the single unit previously described; however, since the displacement rate is now multiplied by a factor equal to the number of pistons, the ratio of leakage rate to displacement rate is greatly reduced. In addition, the leakage arc through sealing band 52' from collector nozzle 49' is greatly reduced since the arc through which collection takes place is greatly increased. It is apparent that the stacked cylinder arrangement can be used advantageously to reduce leakage losses with other types of abutment action. For example, the abutment member could be adjacent or equally spaced from opposed cylinder end faces.

An additional stacked piston-cylinder unit may be located in horizontally opposed relation to unit 30' and this is depicted at 30'' in FIGURE 9.

Other modifications without departing from the spirit of the present invention are possible. For example, the abutment plate may be replaced by two endless belts; one to provide for piston escapement and the other to provide for collection, in the case of compressor operation or supply in the case of fluid motor operation. The abutment belt would contain a plurality of slotted portions to allow successive pistons to pass through and would rotate about an end face similar to 35' in FIGURE 10. The second belt containing a plurality of port openings would operate in a plane at 90° relative to the first and would serve to communicate each cylinder with a collection plenum chamber in the case of compressor operation.

Although the foregoing discussions have assumed that the device operates as a fluid compressor, it is obvious that the identical structure will serve equally as well when operating as a fluid motor or expander, in which case, the piston or pistons would be driven by high pressure and/or high temperature working fluid. Since it is only necessary to cool single piston elements rather than myriad turbine blades, it is clear with the present device that higher temperature fluids can be handled.

Moreover, the finite clearances between the elements in addition to satisfying the high speed requirements permit the use of relatively abrasive or corrosive fluids in that absolute sealing is not essential.

Other modifications will suggest themselves to those skilled in the art; therefore, it is intended that the present invention should be limited only by the scope of the appended claims.

What is claimed is:
1. A device of the character described comprising:
   (1) means providing a generally annular cylinder,
   (2) piston means rotatably mounted in said cylinder,
   (3) the cross sectional area of said piston means and that of said annular cylinder being so related as to provide a finite clearance area therebetween equal to a small percentage of the area of said piston means,
   (4) abutment means rotating in timed relation to said piston means,
   (5) means providing unrestricted fluid communication with said cylinder, said means having an area that is greater than the cross sectional area of said cylinder,
   (6) said annular cylinder being discontinuous defining two spaced open end faces, and
   (7) said abutment means being located adjacent one of said open end faces and spaced from said other open end face.

2. The device according to claim 1 wherein:
   (8) said means providing unrestricted fluid communication includes passage means terminating in a surface of said abutment means that passes adjacent said one open end face.

3. The device according to claim 2 wherein:
   (9) said passage means extends from the rotational axis of said abutment means to said surface.

4. A device of the character described comprising:
   (1) means providing a generally annular cylinder,
   (2) piston means rotatably mounted in said cylinder,
   (3) the cross sectional area of said piston means and that of said annular cylinder being so related as to provide a finite clearance area therebetween equal to a small percentage of the area of said piston means,
   (4) abutment means rotating in timed relation to said piston means, and
   (5) means providing unrestricted fluid communication with said cylinder, said means having an area that is greater than the cross sectional area of said cylinder and includes passage means terminating in a side edge of said abutment means.

5. The device according to claim 4 wherein:
   (6) said side edge is generally cylindrical.

6. A device of the character described comprising:
   (1) means providing a generally annular cylinder,
   (2) piston means rotatably mounted in said cylinder,
   (3) the cross sectional area of said piston means and that of said annular cylinder being so related as to provide a finite clearance therebetween equal to a small percentage of the area of said piston means,
   (4) abutment means rotating in timed relation to said piston means,
   (5) means providing unrestricted fluid communication with said cylinder, said means having an area that is greater than the cross sectional area of said cylinder, and
   (6) additional annular cylinders in side by side stacked relation to said first mentioned annular cylinder,
   (7) piston means rotatable in each of said additional cylinders, and
   (8) said abutment means comprises a single abutment member rotating adjacent said cylinders.

7. The device according to claim 6 wherein:
   (9) said annular cylinders are discontinuous defining two groups of spaced open end faces, and
   (10) said single abutment member is located adjacent one of said groups of open end faces and spaced from the other group of open end faces.

8. The device according to claim 7 wherein:
   (11) said means providing unrestricted fluid communication includes passage means terminating in a surface of said abutment member that passes adjacent said one group of open end faces.

9. The device according to claim 8 wherein:
   (12) said passage means extends from the rotational axis of said abutment member to said surface.

10. The device according to claim 6 wherein:
    (9) said means providing unrestricted fluid communication includes passage means terminating in a side edge of said abutment member.

11. The device according to claim 10 wherein;
    (10) said side edge is generally cylindrical.

12. A device of the character described comprising:
    (1) means providing a generally annular cylinder,
    (2) piston means rotatably mounted in said cylinder,
    (3) the cross sectional area of said piston means and that of said annular cylinder being so related as to provide a finite clearance area therebetween equal to a small percentage of the area of said piston means,
    (4) abutment means rotating in timed relation to said piston means, and
    (5) means providing unrestricted fluid communication with said cylinder, said means having an area that is greater than the cross sectional area of said cylinder and includes passage means terminating in a surface of said abutment means.

13. The device according to claim 12 wherein:
    (6) said passage means extends from the rotational axis of said abutment means to said surface.

14. A device of the character described comprising:
    (1) means providing a generally annular cylinder,
    (2) piston means rotatably mounted in said cylinder,
    (3) the cross sectional area of said piston means and that of said annular cylinder being so related as to provide a finite clearance area therebetween equal to a small percentage of the area of said piston means,
    (4) abutment means rotating in timed relation to said piston means,
    (5) means providing unrestricted fluid communication with said cylinder, said means having an area that is greater than the cross sectional area of said cylinder, and
    (6) said small percentage being greater than 0.3 percent and less than 3.0 percent.

15. A device of the character described comprising:

(1) means defining a plurality of generally annular cylinders in side by side stacked relation, (2) piston means rotatably mounted in each of said cylinders, (3) a single abutment member adjacent said cylinders and rotating in timed relation to said piston means, and (4) means providing fluid communication with said cylinders.

16. The device according to claim 15 wherein:

(5) each of said annular cylinders are discontinuous defining two groups of spaced open end faces, and (6) said single abutment member is located adjacent one of said groups of open end faces and spaced from the other group of open end faces.

17. The device according to claim 16 wherein:

(7) said means providing fluid communication includes passage means terminating in a surface of said abutment member that passes adjacent one group of open end faces.

18. The device according to claim 17 wherein:

(8) said passage means extends from the rotational axis of said abutment member to said surface.

19. The device according to claim 15 wherein:

(5) said means providing fluid communication includes passage means terminating in a surface of said abutment member.

20. The device according to claim 19 wherein:

(6) said passage means extends from the rotational axis of said abutment member.

21. A device of the character described comprising:

(1) means providing a generally annular cylinder, (2) piston means rotatably mounted in said cylinder, (3) abutment means rotating in timed relation to said piston means having a surface that is adjacent said cylinder, (4) means providing fluid communication with said cylinder including passage means extending from the rotational axis of said abutment means to a surface thereon, (5) said annular cylinder being discontinuous defining two spaced open end faces, and (6) said abutment means being located adjacent one of said open end faces and spaced from said other open end face.

22. The device according to claim 21 wherein:

(7) said surface on said abutment means is a side edge thereof that passes adjacent said one open end face.

23. A fluid compressor comprising:

(1) means defining a generally annular cylinder having a discontinuity, (2) piston means rotatably mounted in said cylinder and passing through said discontinuity, (3) abutment means rotatable in timed relation to said piston means having a surface that traverses said discontinuity, (4) passage means rotating with said abutment means for communicating with said cylinder, and (5) the extent of said passage means being such that communication with said cylinder begins when the last of a successive number of shock waves, caused by said piston reentering said cylinder after passage through said discontinuity, arrives at said discontinuity.

24. The compressor according to claim 23 wherein:

(6) the length of said cylinder is such that said piston passes through said discontinuity thereby reentering said cylinder at or before the shock wave, created by the traversal of said abutment means through said discontinuity, arrives at said discontinuity.

25. The compressor according to claim 24 wherein:

(7) said cylinder discontinuity defines two spaced open end faces, (8) said abutment means being located adjacent one of said open end faces and spaced from the other of said open end faces, (9) the last of said successive number of shock waves arrives at said one open end face, and

(10) the shock wave created by traversal of said abutment means arrives at said other open end face.

26. In a device of the character described the combination comprising:

(1) a plurality of annular cylinders in side by side stacked relation, the inner portion of each terminating in an internal opening, (2) a unitary drum rotatably mounted in said openings and extending the length of said stacked cylinders, and (3) pistons angularly arranged about said drum rotatable severally in said cylinders.

27. The device according to claim 26 wherein:

(4) each of said cylinders are discontinuous defining two groups of spaced open end faces, and (5) said pistons rotate sequentially out of one group of end faces into the other group of end faces.

28. A device of the character described comprising:

(1) means defining a generally annular discontinuous cylinder having two spaced open end faces, (2) piston means rotatably mounted in said cylinder, (3) abutment means rotating in timed relation to said piston means and located adjacent one of said open end faces and spaced from the other open end face, and (4) means providing fluid communication with said cylinder.

References Cited

UNITED STATES PATENTS

| 2,411,707 | 11/1946 | Biermann | 230—158 XR |
| 2,887,958 | 5/1959 | Davidson | 103—108 XR |
| 3,060,910 | 10/1962 | McCall | 123—130 |

FOREIGN PATENTS

| 1,082,918 | 6/1960 | Germany. |

HENRY F. RADUAZO, *Primary Examiner.*

U.S. Cl. X.R.

123—13; 253—1